Patented Sept. 15, 1953

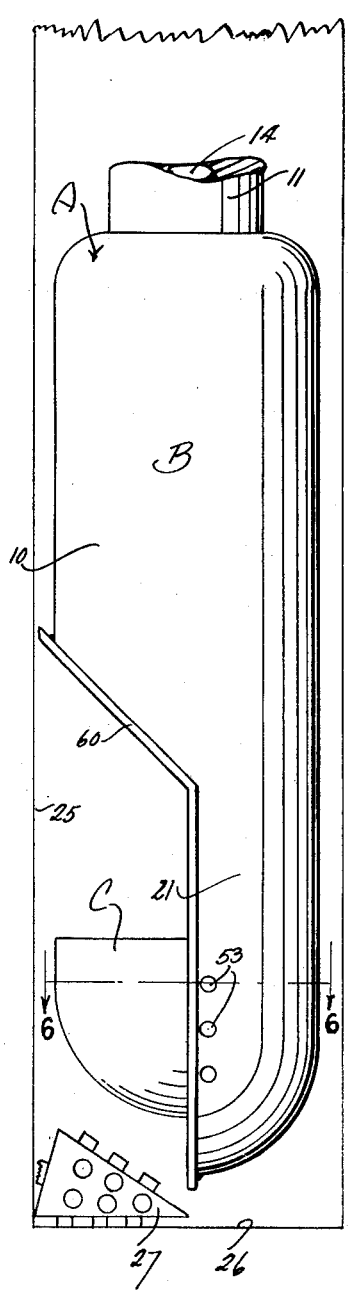
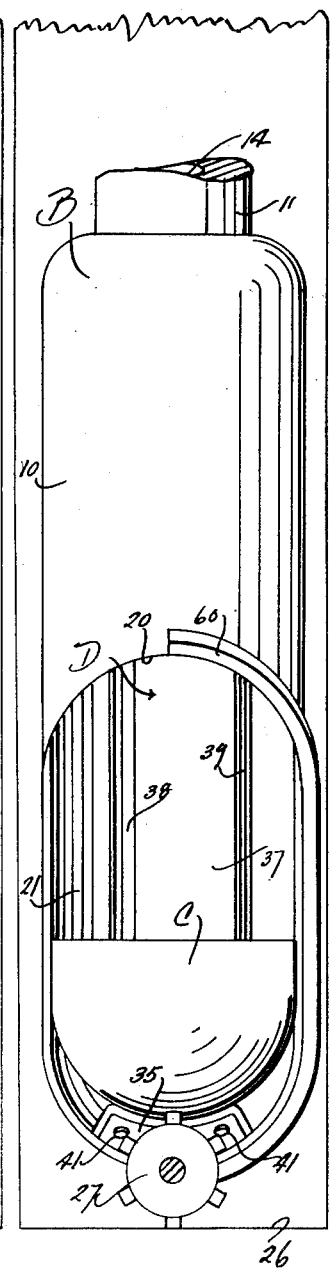
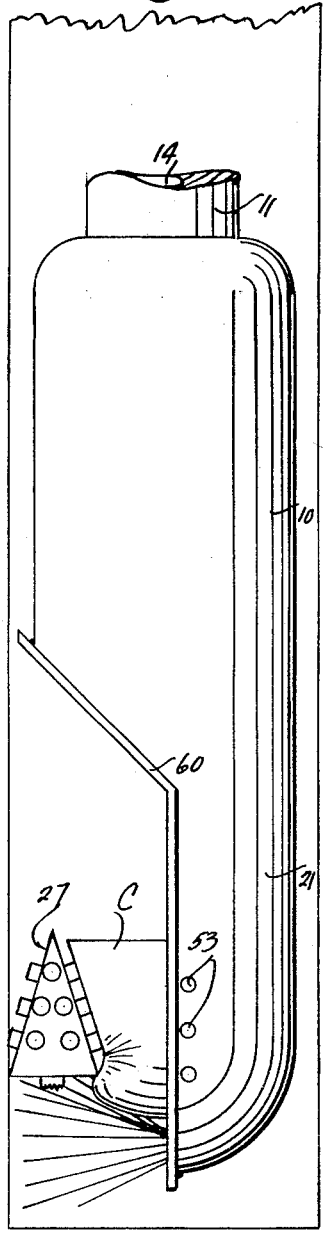

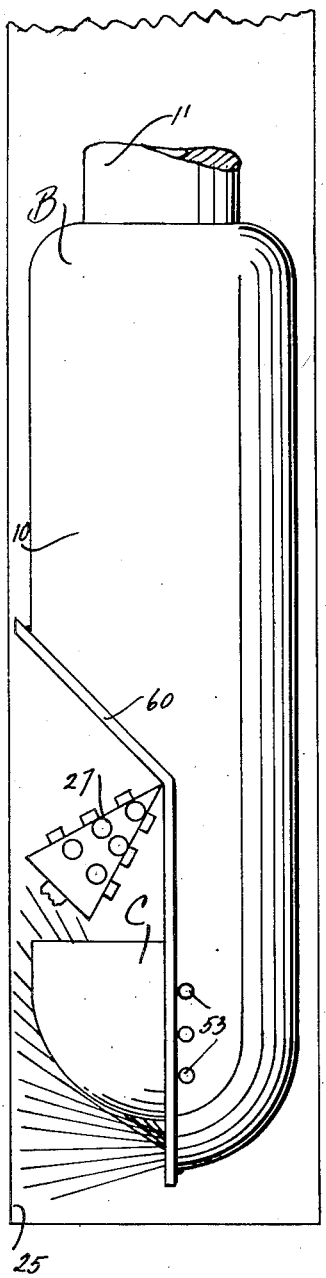
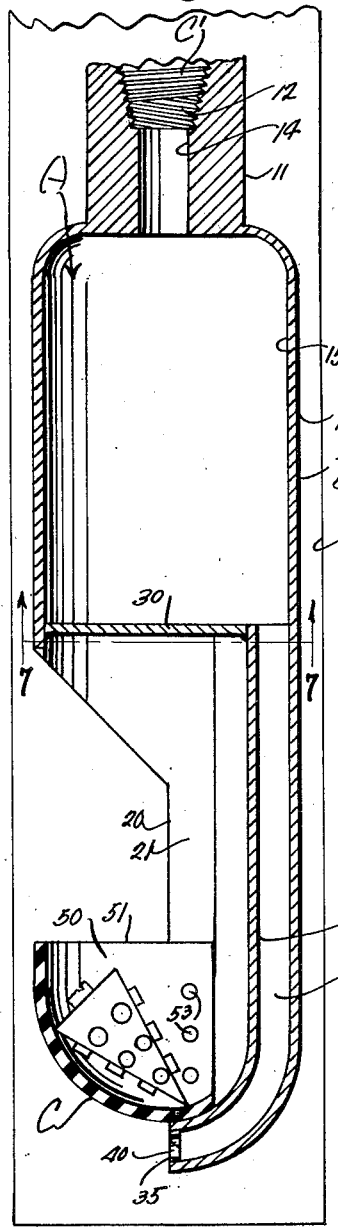
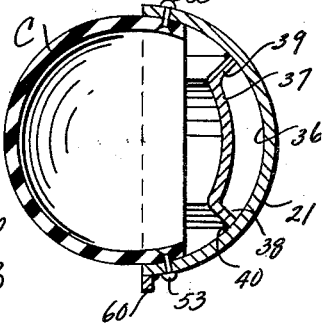
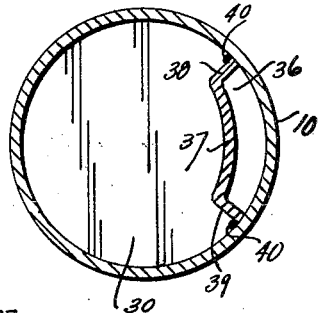
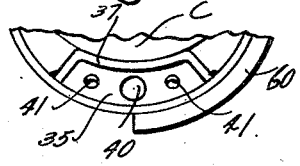

2,652,119

UNITED STATES PATENT OFFICE 2,652,119

HYDRAULICALLY ACTUATED FISHING TOOL FOR RECLAIMING BROKEN DRILL PARTS, ETC., FROM WELLS

Seth R. Knapp, Elk City, Okla.

Application November 1, 1949, Serial No. 124,832

8 Claims. (Cl. 166—19)

This invention relates to improvements in hydraulically actuated fishing tools for reclaiming broken drill parts, etc. from wells.

The primary object of this invention is the provision of a fishing tool adapted to recover broken drill parts and other junk from wells, having means associated therewith to permit of recovery from the well of large broken drill parts.

A further object of this invention is the provision of an improved fishing tool adapted to recover broken drill parts, etc. from wells. It has an improved collapsible basket associated therewith to receive the broken drill parts, etc., so constructed and arranged as to admit of the broken drill parts passing with ease into the basket.

A further object of this invention is the provision of an improved fishing tool of the class described having an improved means for guiding the broken drill parts to the window side of the tool.

A further object of this invention is the provision of a fishing tool for recovering broken drill parts etc., having improved means for directing a lifting fluid into the well and against the broken drill parts, etc. for the purpose of lifting the same into the tool.

Other objects and advantages of the invention will appear in the following detailed description.

In the accompanying drawings, forming a part of this specification, and wherein similar reference characters designate corresponding parts thruout the several views, Figure 1 is a side elevation of the improved fishing tool in lowered position in a well for the capture of a broken drill bit.

Figure 2 is a front elevation showing the window side of the tool.

Figure 3 is a side elevation similar to Figure 1, but showing how the tool is operated so that a lifting fluid may raise the broken drill part into a basket of the tool.

Figure 4 is a view similar to Figure 3, but showing the manner in which the basket after collapsing, to permit passage of the drill bit, will snap into position to reclaim the drill bit or other part.

Figure 5 is a vertical cross sectional view taken thru the fishing tool showing the associated features thereof and the manner in which a broken drill bit part or other junk rests in the basket.

Figure 6 is a transverse cross sectional view taken thru the fishing tool substantially on the line 6—6 of Figure 1.

Figure 7 is a transverse cross sectional view taken substantially on the line 7—7 of Figure 5.

Figure 8 is a fragmentary front view of the nozzle end of the fishing tool.

In the drawings, wherein for the purpose of illustration is shown only a preferred embodiment of the invention, the letter A may generally designate the fishing tool. It preferably comprises a housing or frame B to which the rotary drill line C' is attached. Improved collapsible basket means C is associated with the housing or casing structure B and improved means D is provided for the travel and ejection of the water or other fluid, to the nozzle end of the tool.

The member B preferably is in the form of a tubular casing including a cylindrical body portion 10 having a tank 11 at the upper end thereof provided with a screw socket 12 to receive a conventional drilling stem C', thru which the fluid travels into the passageway 14 of the neck and thence into the compartment 15 at the upper end of the body 10. The latter at substantially the lower half of the tool is cut away, since the casing is ordinarily constructed of tubular stock. The lower portion 21 has an opening 20 thereto, and is segmental in cross section, as clearly shown in Figure 6 of the drawings. The diameter of the body 10 may vary, to suit the diameter of the well 25 into which the tool is to be lowered. The well compartment 25 is merely diagrammatically represented in the drawing and the bottom is designated 26, and upon which bottom a broken drill bit 27 is shown in Figure 1.

The basket C is supported at the lower end of the segmental portion 21 of the housing B for the purpose of receiving captured drill parts, etc.

Somewhere in the vicinity of the juncture of the body 10 and the segmental portion 21, the compartment 15 is divided from the lower part of the casing B by horizontal partition wall 30. This provides a compartment 15 of considerable capacity for receiving a proper volume of the fluid to be used in hydraulically removing the junk from the well.

In order to provide a basket having sufficient volume to receive broken drill parts, etc. of considerable size and number, and yet provide a water travel passageway of sufficient capacity extending from the compartment 15 to the nozzle plate 35, I provide a segmental-shaped water travel passageway 36 formed by providing a segmental-shaped piece 37 struck from the same radius as the segmental wall 21. It has side walls 38 and 39, the latter of which are welded at 40 to the inside surface of the casing B, as shown in Figures 6 and 7 of the drawings. The casing wall and the passageway providing wall 37 are concentric and provide a passageway 36 while yet conserving space in the casing in the vicinity of the basket C, for the reception of pieces of broken drill parts, etc.

The passageway 36 curves at the extreme lower end of the casing B and outlets upon the nozzle plate 35 which is welded across said passageway and provides a discharge nozzle opening 40 which may be so positioned as to direct the fluid outwardly and under the broken drill parts. The nozzle plate 35 also includes other smaller openings 41 which may be sloped upwardly to direct the fluid upwardly to give more lift to the parts to be lifted. If desired, the opening 40 may slope downwardly, but it will be sufficiently large to enable a jet stream of sufficient force to lift the broken drill parts into the basket C; the force of the fluid pumped, of course, aiding in this respect.

The basket C constitutes an improved part of this invention. It is formed of collapsible material, either rubber, synthetic composition, belting, collapsible plastic or spring metal material and is provided so that the force of the jet will lift the drill part between the basket and the well wall, causing the basket to collapse, as shown in Figure 3, in order that the part may pass upwardly and into the basket; the collapsible basket being sufficiently springy to snap back immediately into extended position after the broken bit part has been lifted to a location immediately above the basket, in order that it can properly receive the broken drill part. It will be noted, in this respect, that the shape of the passageway providing wall 37 enables the provision of a large compartment for receiving the drill parts.

The operation of the tool will be self-evident, from the foregoing. It is merely necessary to lower the tool into the well to the point indicated in Figure 1. An important feature of the invention is the provision of a guiding and positioning flange 60 welded or otherwise secured to the casing B immediately around one-half of the opening 20, at the trailing side of the tool. This flange 60 projects beyond the outer surface of the casing B and will assist in engaging and guiding the broken drill parts and other junk into facing relation with the window opening 20. If desired, this flange may be placed entirely around the opening 20, but it is preferred only to have it at the trailing side of the tool. It is, of course, understood that all parts of the invention are made of rigid material except the collapsible basket C. The flange 60 not only assists in guiding the junk into the window opening but loosens any junk parts and also will catch onto the junk to inform the operator of the presence of the same.

The operator having lowered and turned the tool and found that some junk or broken drill parts exist in the well, after facing the window opening into the proper position, ejects the fluid thru the nozzle 35. This lifts the junk part and due to the collapsible nature of the basket the junk part will be lifted with the basket since with this arrangement it is possible to lift a junk part of a dimension appreciably more than one-half of the diameter of the well bore, as can be appreciated from the foregoing. The provision of the segmental depending portion and its basket at the open side of the chamber therein will enable not only the reclaiming of very large parts but such enables the parts to be reclaimed more efficiently and expeditiously and with less expense than with conventional tools having merely a cylindrical rotary reclaiming housing.

Various changes in the shape, size and arrangement of parts may be made to the form of the invention herein shown and described without departing from the spirit of the invention or the scope of the following claims.

I claim:

1. A tool for capturing broken drill parts and other junk from a well bore comprising a rotatable casing and supporting structure having a compartment in the lower end thereof provided with a laterally facing window opening therein for receiving junk therethru from the well bore, an open topped laterally collapsible junk receiving basket supported by said structure directly in said window opening and below the top of said window opening, and nozzle means for forcefully ejecting a stream of water into a well bore at a location below the basket.

2. A tool for recovering broken drill parts and other junk from a well bore comprising a supporting frame having a lower portion reduced and defining a compartment therein and having a laterally opened window opening to said compartment, a collapsible cup-shaped basket having a compartment therein secured to said extensions and projecting from said window opening and therebeyond closed at the bottom and having an upwardly facing opening to the compartment thereof, the compartment of said basket being open to the compartment of said extension whereby to provide an enlarged recovery chamber, and fluid ejecting means carried by said frame and extension thereof for lifting broken drill parts and junk into said basket, said basket being of inherently springy and collapsible material to permit the same to collapse as junk parts pass upwardly and into a location above the basket.

3. A tool for recovering broken parts and other junk from a well bore comprising a rotatable supporting frame having a lower portion depending therefrom to one side only of the bore and of a width to occupy a place in the well bore mainly to one side of the axis of the bore to permit junk and broken drill parts to enter upwardly through the bore at the opposite side of said depending portion, means embodied in said supporting frame for forcefully ejecting a jet of fluid at the lower end of the depending portion so that the same will wash and lift junk and broken drill parts upwardly into the unobstructed space between the depending portion of the frame and the wall of the well bore, and a laterally collapsible basket mounted upon the lower portion of said supporting frame above said jet extending into said unobstructed space and of a material having an inherent tendency to resume such position after being collapsed and having a chamber therein opening upwardly whereby pieces of junk and broken drill parts lifted by said jet will collapse the basket until the parts are disposed above and past said basket whence they will drop by gravity into said basket.

4. A tool for reclaiming and capturing broken parts and other junk from a well bore comprising a rotatable supporting structure having the lower end thereof provided with a chamber having a lateral window opening thereto, means carried by said structure for providing a nozzle for the ejection of a stream of water laterally and upwardly in the direction of the window opening when the structure is disposed within a well bore, and a laterally collapsible basket carried by said structure directly in said window opening and projecting laterally beyond the window opening having a closed bottom and an open top, the open top terminating below the top of the window opening whereby junk and drill parts may be swept by the stream of water from the nozzle upwardly into collapsing relation past the basket to a point above the basket whence the same passes through the window opening into the open basket.

5. In a tool for recovering broken drill parts and other junk from a well bore the combination of a rotatable frame, having a chamber therein, a junk supporting basket mounted upon said frame to one side of the chamber and having an open topped compartment therein sufficient to support junk falling therein from the open top, said basket being constructed of springy and collapsible material and being laterally collapsible upon said frame, and means upon said frame for ejecting a stream of water into a well bore from below said basket for lifting junk upwardly past the outside of said basket for laterally collapsing the basket until the junk reaches a point above said basket and therefrom falls into the open top thereof, the springy and collapsible material normally and inherently assuming an extended position upon said frame except when laterally collapsed as junk passes thereby.

6. In a tool for reclaiming and recovery of broken drill parts and other junk from a well bore the combination of a rotatable frame having means at the lower end thereof for laterally and upwardly projecting a forceful jet of fluid for the lifting of said junk, and a laterally collapsible junk retaining basket mounted upon said frame in laterally projecting relation from said frame and above said jet providing means and formed of an inherently springy and collapsible material which will laterally collapse as junk passes thereby and having an inherent tendency to snap back into its extended position after the junk passes the same.

7. In a tool for receiving broken drill parts from a well bore the combination of a rotatable casing structure having a lower laterally reduced end which when within a well bore is spaced farther away from one side of the well bore than the upper part of said casing structure, means upon the lower end of the casing providing a nozzle for directing a forceful jet of water into the well bore at the lower portion of said reduced end and at said farther spaced side of said reduced end, a laterally collapsible basket of inherently springy material having an inherent tendency to assume and snap back to an extended position and being cup-shaped to provide a top opening to the chamber therein, and means mounting said basket upon said reduced end at the side thereof which will be farthest spaced from the well bore when within it, said basket being located below the upper portion of said reduced end and above the jet flow of water whereby junk lifted by the jet stream as it passes the basket in the well bore will laterally collapse the basket until it reaches a point above the basket whence the basket will snap back to its extended position for catching the junk as it drops by gravity thereinto.

8. In a tool for capturing broken drilling parts and other debris from the bottom of a well bore the combination of a rotatable housing structure including an upper cylindrical shaped body portion provided with a passageway therethrough of a size capable of receiving therein the usual broken and lost drilling parts and other debris to be reclaimed for passage therethrough and a segmental shaped portion connected to and depending from the cylindrical body portion substantially to one side of the longitudinal axis of said housing portion, said segmental portion having a chamber therein opened at its top to the passageway of the cylindrical body portion and also opened laterally to the well bore at the chord side of the segment, a collapsible basket mounted upon and at the open side of said segmental portion having a chamber therein opening upwardly in direct facing relation with the passageway of the cylindrical portion, said basket extending into the space beyond the chord side of the segmental portion and there being collapsible to permit the free upward movement of parts to be reclaimed past said basket, and means in said housing structure for forcefully directing a stream of lifting fluid in the well bore at a location below the basket.

SETH R. KNAPP.

References Cited in the file of this patent

UNITED STATES PATENTS

| Number | Name | Date |
|---|---|---|
| 2,169,922 | Notley | Aug. 15, 1939 |
| 2,181,187 | Jennings | Nov. 28, 1939 |
| 2,220,989 | Brauer | Nov. 12, 1940 |
| 2,525,954 | Schabarum | Oct. 17, 1950 |
| 2,556,849 | Nolley et al. | June 12, 1951 |